July 3, 1962 R. S. GRAHAM 3,042,751

PULSE TRANSMISSION SYSTEM

Filed March 10, 1959 3 Sheets-Sheet 1

INVENTOR
R. S. GRAHAM
BY R. O. Nimtz
ATTORNEY

July 3, 1962 R. S. GRAHAM 3,042,751

PULSE TRANSMISSION SYSTEM

Filed March 10, 1959 3 Sheets-Sheet 2

INVENTOR
R. S. GRAHAM
BY [signature]
ATTORNEY

PULSE TRANSMISSION SYSTEM

Filed March 10, 1959 3 Sheets-Sheet 3

INVENTOR
R. S. GRAHAM
BY R. O. Nimz [signature]
ATTORNEY

United States Patent Office 3,042,751

Patented July 3, 1962

3,042,751

PULSE TRANSMISSION SYSTEM

Robert S. Graham, Bernardsville, N.J., assignor to Bell Telephone Laboratories, Incorporated, New York, N.Y., a corporation of New York Filed Mar. 10, 1959, Ser. No. 798,404

17 Claims. (Cl. 179—15)

This invention relates to pulse transmission systems and, more particularly, to retiming a plurality of pulse signals.

In a large and extensive pulse transmission network it is not always economical to maintain exact synchronism between the pulse rates in the various parts of the network. In a communication network of continental scope, for example, which uses pulse coding techniques to transmit speech, television signals or similar information, it may be difficult, if not impossible, to synchronize pulse rates in widely separated geographical locations. Yet it may be desired to bring these pulse signals to a common point and synchronously combine or otherwise operate upon them. It may be desired, for example, to multiplex these signals using high speed time division methods onto a common transmission facility such as a transcontinental wave guide.

The use of a common clock signal transmitted to all parts of the country for synchronization purposes appears undesirable for several reasons. Such a system would, in the first place, require expensive clock signal transmission facilities which might not find any other use in the system. Furthermore, the day-to-day variations in the characteristics of transmission facilities of such an extent would prevent or greatly complicate exact synchronization, particularly for transmission at the highest possible pulse rates, requiring the greatest accuracy of timing. Signals on a single transmission line of any substantial length, for example, would encounter continuous variations in the propagation time of the line due to temperature changes along its route. Such temporary variations would cause changes in the effective pulse rate at the end of the line even though the input pulse rate was constant.

It is an object of the present invention to synchronously combine or otherwise synchronously operate upon a plurality of asynchronous pulse trains of varying pulse rates.

It is a more specific object of the invention to retime each of a plurality of asynchronous pulse trains to a common pulse rate.

It is a further object of the invention to encode, transmit and decode the retiming information concerning a plurality of asynchronous pulse trains retimed to a common pulse rate.

In accordance with one embodiment of the present invention, a plurality of asynchronous pulse trains, derived from a corresponding plurality of geographically separated unsychronized pulse transmitters, are retimed by a common clock source of slightly higher repetition rate than the highest pulse rate to be synchronized. More specifically, a variable delay is included in the path of each pulse train and the delay continuously reduced just sufficiently to maintain synchronism with the clock source. Since the clock source is of a higher repetition rate than any of the asynchronous pulse trains, eventually the reduction in delay becomes a full pulse period. At this time an extra pulse is inserted in the pulse train to bring its repetition rate up to that of the clock source. Simultaneously, the full delay is reintroduced into the pulse path. In this way, a delay of no more than a single pulse period is sufficient for retiming.

In further accord with the present invention, information concerning the value of the delay in each of a plurality of pulse paths is encoded and transmitted along with the retimed pulse trains. This information is later decoded and used to recover the original timing and delete the extraneous pulses.

It can be seen that the present invention makes possible the synchronization of any number of pulse trains of differing repetition rates. This end is accomplished in an efficient manner by the use of simple variable delays. Thus it is possible, for example, to multiplex these pulse trains in spite of the disparities between their repetition rates.

These and other objects and features, the nature of the present invention and its various advantages, will appear more fully upon consideration of the attached drawings and of the following detailed description of these drawings.

Figure 1:
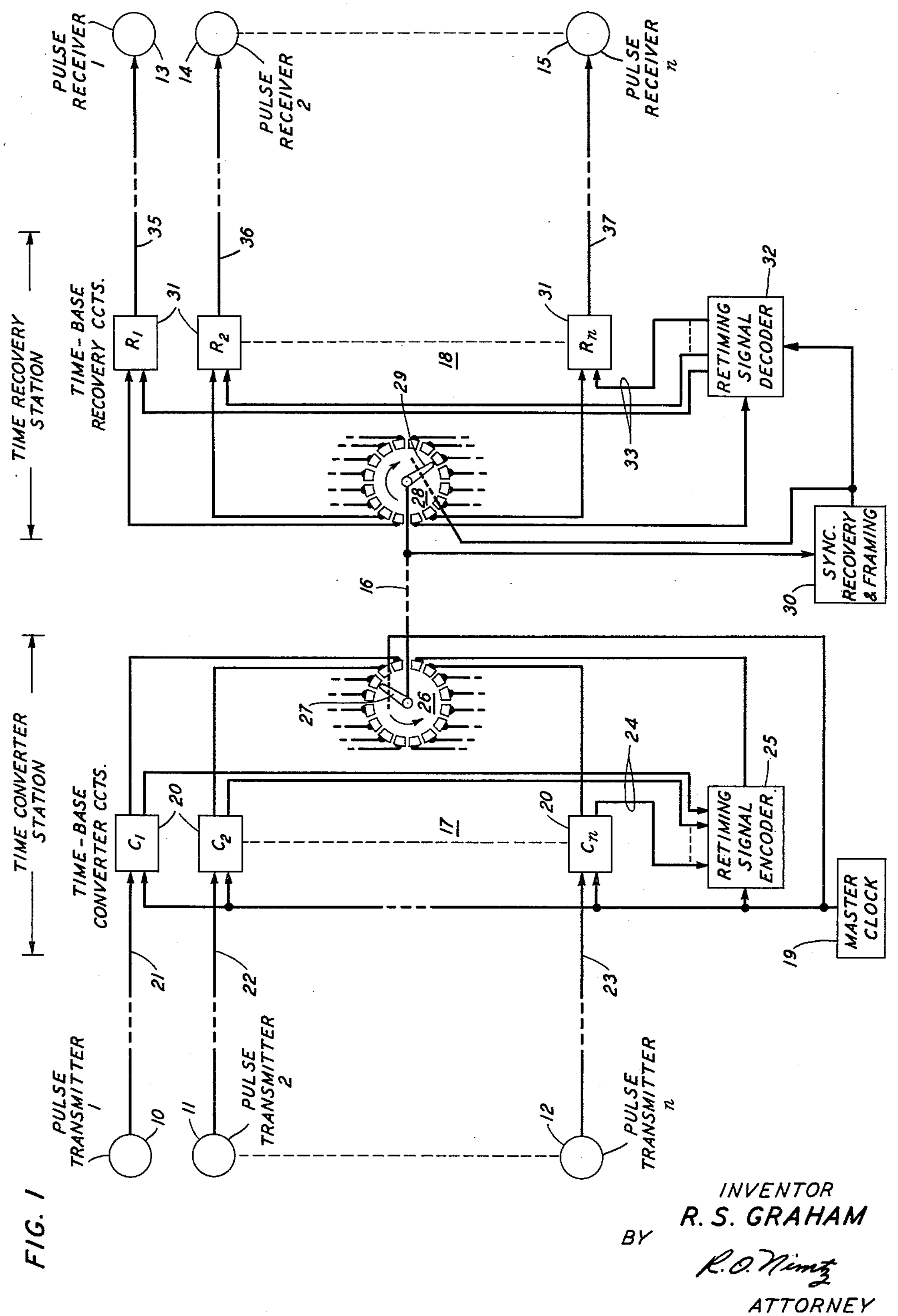
FIG. 1 is a schematic block diagram of a pulse multiplexing system in accordance with the present invention.

Referring more particularly to FIG. 1, there is shown a block diagram of a time division pulse multiplexing system in accordance with the present invention comprising a plurality of pulse transmitters 10, 11, . . . 12 and a corresponding plurality of pulse receivers 13, 14, . . . 15. Pulse transmitters 10 through 12 are located at geographically separated locations as are pulse receivers 13 through 15. While transmitters 10 through 12 are each separated from all of the other transmitters by a substantial distance, and similarly with receivers 13 through 15, the general location of transmitters 10 through 12 is considerably more separated from the general location of receivers 13 through 15. Such would be the case, for example, if pulse transmitters 10 through 12 were dispersed along the eastern coast of continental United States while pulse receivers 13 through 15 were dispersed along the western coast.

In any event, pulse transmitters 10 through 12 are sufficiently dispersed to make full synchronization between the various pulse rates difficult, if not impossible. If, for example, synchronization is attempted by the transmission of a common clock signal to all of the pulse transmitters 10 through 12, there is required a transmission link interconnecting all of these transmitters to carry the clock signal. This transmission link, because of the substantial distances involved, would be complicated, expensive and subject to failures. Furthermore, such clock signal transmission facilities might find no other use in the transmission system and hence be wasteful of transmission capacity. Finally, the local variations in the transmission characteristics of such facilities, due to temperature, humidity and other local effects, would degrade the timing accuracy of the clock signal. Indeed, such variations would change the effective clock rate at each of the pulse transmitters 10 through 12 and hence prevent exact synchronization.

In spite of the difficulties of common synchronization between pulse transmitters 10 through 12, it may be desirable to multiplex or otherwise synchronously combine or operate upon the pulse signals from these transmitters. Thus, for example, it may be desired to transmit the pulse signals from a plurality of transmitters on the east coast of continental United States to the west coast over a single transmission facility. Such a transmission facility, illustrated schematically in FIG. 1 as transmission line 16, may comprise a microwave wave guide or other long distance transmission facility with the capacity for carrying a large number of pulse signals by time division multiplex techniques. It is to make such multiplexing or other synchronous combining of asynchronous pulse signals possible, that the present invention is directed.

In accordance with the present invention, a time converter station 17 is provided to retime pulse signals from a plurality of pulse transmitters, such as pulse transmitters 10 through 12, to a common time base for multiplexing on transmission facility 16. A time recovery station 18 is also provided at the remote end of transmission facility 16 to recover the original timing of the various pulse signals and to deliver them to respective ones of a plurality of pulse receivers, such as pulse receivers 13 through 15. In this way, transmission of all of the asynchronous pulse signals may be effected through a single transmission facility 16 by means of time division techniques.

Time converter station 17 comprises a master clock source 19 which is utilized to retime all of the various asynchronous pulse trains from transmitters 10 through 12 to a common time base. Time base converter circuits 20 are therefore provided, one for each of pulse transmitters 10 through 12. To each of converter circuits 20, there is applied the pulse signal from one of the pulse transmitters 10 through 12 by means of pulse transmission lines 21 through 23, respectively. Each of converter circuits 20 utilizes clock pulses from master clock 19 to retime the pulse signal applied to it. One means for accomplishing such retiming will be hereinafter described.

In order to alter the time base of the pulse signals, converter circuits 20 operate upon the pulse trains to change their basic repetition rate. The details of such an operation may be represented as signal conditions on conductors 24. These signal conditions, representing retiming information, and hence termed "retiming signals," are applied to retiming signal encoder 25. Also applied to retiming signal encoder 25 are clock pulses from master clock 19. An encoder circuit suitable for the retiming signals will be hereinafter described.

The total time available on transmission line 16 is divided up into a sequence of discrete time intervals or "time-slots" by means of a commutator 26. Commutator 26, illustrated graphically as a mechanical commutator having a brush 27 successively passing over a plurality of commutator segments, can in fact comprise an electronic commutator of any type known in the art having a sufficiently high switching speed. Brush 27 is driven by a signal from master clock 19 to successively connect transmission line 16 to the various commutator segments. There are provided on commutator 26, $(n+1)$ segments, where $n$ is the number of pulse transmitters to be served. Retimed pulse signals from each pulse transmitter are assigned to a unique time-slot on transmission line 16 by connection to one of the segments of commutator 26. The $(n+1)$th segment, representing the $(n+1)$th time-slot, is connected to retiming signal encoder 25 and provides a means for transmitting the encoded retiming signals to the remote end of transmission line 16.

At the remote end of transmission line 16, time recovery station 18 comprises a distributing commutator 28 which may also be an electronic commutator. Commutator 28 is provided to separate the multiplexed signals on line 16. Thus, brush 29 of commutator 28 successively contacts the $(n+1)$ segments of commutator 28 under the control of driving pulses from a synchronization recovery and framing circuit 30. Circuit 30 is of any type known in the art which can recover the basic timing of the pulse train on transmission line 16 and, furthermore, can "frame" the pulse groups representing one complete revolution of commutator 26 so as to keep brushes 27 and 29 in phase continuously as they sweep across the segments of their respective commutators. Such framing circuits are disclosed in the copending application of R. L. Wilson, Serial No. 704,928, filed December 24, 1957, now patent 2,953,694 issued September 20, 1960, and in E. Peterson Patent 2,527,650 issued October 31, 1950.

The operation of synchronization recovery and framing circuit 30 permits the delivery of each pulse from any one of time-base converter circuits 20 to a corresponding one of time-base recovery circuits 31 and to deliver encoded retiming signals from encoder 25 to retiming signal decoder 32. Decoder 32, one form of which will be described in detail hereafter, recovers the retiming information generated in converter circuits 20 and delivers this information as signal conditions on conductors 33 to the corresponding ones of recovery circuits 31. Recovery circuits 31 utilize the retiming signals to recover the original timing of the pulse trains, existing as they entered converter circuits 20. The pulse trains, having regained their original timing, are delivered by way of transmission lines 35 through 37 to pulse receivers 13 through 15.

It can be seen that the embodiment of the present invention illustrated in FIG. 1 serves to interconnect a plurality of asynchronous pulse transmitter-receiver pairs through a common time-divided transmission facility. FIG. 1, however, illustrates only one of the many ways in which asynchronous pulse signals may be usefully combined or otherwise operated upon in synchronism. It may be desired, for example, to synchronously record or translate these pulse signals in order to achieve desirable effects. It is to be understood that the embodiment of FIG. 1, to be described in more detail hereafter, is illustrative of only one of the many other possible embodiments which could represent useful applications of the principles of the invention and should in no way be taken as limiting the invention to this one embodiment. Any system in which one or more pulse trains are to be retimed to a selected time base would present an opportunity for a useful embodiment.

Figure 2:
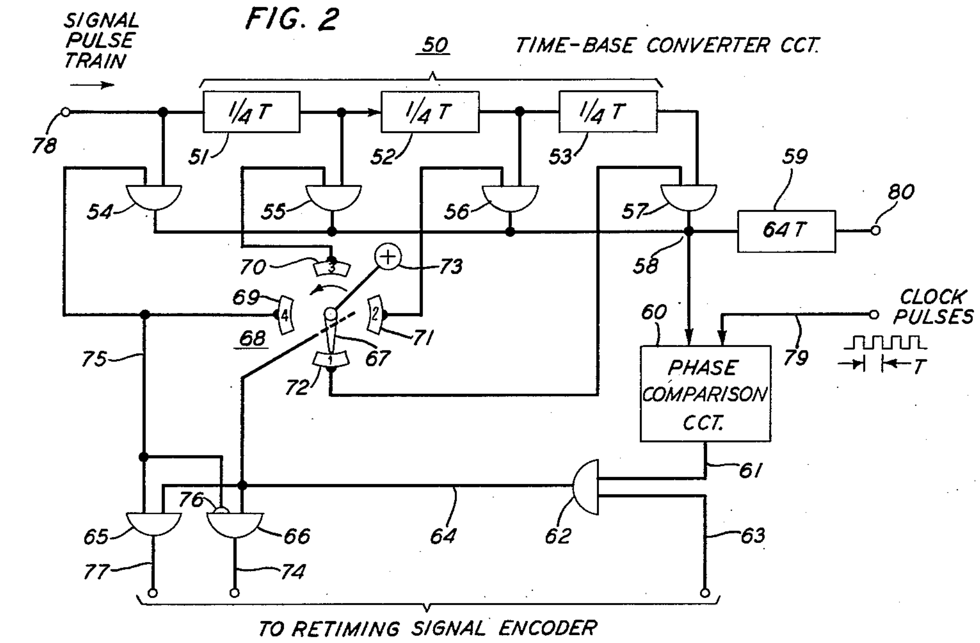
FIG. 2 is a more detailed diagram of one of the time base converting circuits illustrated in block form in FIG. 1.

Referring now to FIG. 2 there is shown a more detailed schematic diagram of a time-base converter circuit suitable for the multiplexing system of FIG. 1. The time-base converter circuit of FIG. 2 comprises a delay line 50 divided into three sections 51, 52 and 53. Connected ahead of the input of delay line 50 is a gate 54 while gates 55 and 56 are connected to the intermediate points on delay line 50 and gate 57 is connected to the output. The outputs of all the gates 54 through 57 are brought to a common point 58 and applied simultaneously to a second delay line 59 and a phase comparison circuit 60. The other input to phase comparison circuit 60 is applied by way of lead 79 from a clock pulse source such as source 19 in FIG. 1.

Phase comparison circuit 60 compares the phase or times of occurrence of pulses from point 58 and clock pulses on lead 79 and produces an output on lead 61 only when the phase difference reaches a preselected amount. Such a phase comparison circuit may comprise, for example, a simple gate followed by an integrator circuit and a threshold device. The gate would then be enabled by the clock pulses to pass all or a portion of the pulses from point 58 to the integrator. The integrator would then integrate whatever portions of these pulses are passed and the integrated signal would be used, when of sufficient amplitude, to enable the threshold device. A threshold device such as a monostable multivibrator could then be arranged to remove the output from lead 61 when enabled and to produce an output on lead 61 when disabled. Other more elaborate phase comparison circuits could also be used equally well, provided only that they produce the proper output when the phase difference reached the preselected value.

The output of phase comparison circuit 60, appearing on lead 61, is applied to a gate 62 to which enabling pulses on lead 63 are also applied. The purpose and origin of these enabling pulses will be described in connection with FIG. 3. It is sufficient to note here that gate 62 is fully enabled and produces an output on lead 64 only when an enabling pulse appears on lead 63 simultaneously with an output from phase comparison circuit 60 on lead 61. The output of gate 62 on lead 64 is simultaneously applied to gate 65, gate 66 and to advance the movable contact 67 of a stepping switch 68.

Stepping switch 68, illustrated graphically as a mechanical stepping switch having a movable contact 67 successively applying a voltage from source 73 to four fixed contacts 69, 70, 71 and 72, may in fact comprise an electronic stepping switch such as a ring counter. The fixed contacts 69 through 72 are connected to second inputs of gates 54 through 57, respectively. Thus movable contact 67 successively applies the voltage from source 73 to gates 54 through 57 to partially enable these gates in succession.

Gate 66 produces an output on lead 74 each time an output is produced from gate 62 on lead 64, provided that movable contact 67 is not resting on fixed contact 69. When movable contact 67 is resting on fixed contact 69, a voltage is applied from source 73 to contact 69. This voltage is applied by way of lead 75 to an inhibit input 76 of gate 66. As long as a signal is present at inhibit input 76, no output is produced by gate 66.

Gate 65 is enabled and produces an output on lead 77 by the simultaneous appearance of signals at the output of gate 62 and on lead 75, indicating that fixed contact 69 is being energized by movable contact 67.

Having described in detail the components of the time-base converter circuit of FIG. 2, the manner in which this circuit operates will now be described. A pulse train to be retimed is applied to terminal 78 and is transmitted down delay line 50. The amount of delay introduced into the path of this pulse train is made variable by the selective operation of gates 54 through 57. Thus, if gate 54 is enabled, the pulse train arriving at point 58 has had no delay in its path while, if gate 57 is enabled, the full delay of line 50 is introduced into the path of the pulse train. The enablement of either gate 55 or 56 varies the delay between these two extremes.

No matter what the delay introduced into the path of the pulse train, this train arrives at point 58 and is applied to phase comparison circuit 60. Each pulse of this train is compared in circuit 60 with a clock pulse on lead 79. If the phase difference is of sufficient magnitude, an output is produced on lead 61 and, when an enabling pulse appears on lead 63, movable contact 67 is advanced one step in a counter-clockwise direction. If, for example, movable contact 67 is resting on fixed contact 72 as illustrated, it will be stepped to contact 71. Gate 57 will therefore be disabled and gate 56 enabled. The effect of stepping switch 68 is therefore to successively decrease the delay introduced in the path of the input pulse train. If it is assumed that the clock pulse repetition rate is higher than the repetition rate of the input pulse, reduction of this delay will tend to bring the two pulse trains back into phase.

For the purposes of convenience, delay line 50 is divided into three sections of equal delay, each having a delay of one quarter of the pulse period of the clock pulses on lead 79. Phase comparison circuit 60 is then arranged to respond only to phase differences exceeding one-eighth of a pulse period of the clock pulses. In this way, the two pulse trains can be kept in phase to within one-eighth of a pulse period. It is clear, however, that a higher degree of precision can be obtained by further subdividing delay line 50 into sections of less delay and by arranging phase comparison circuit 60 to respond to smaller phase differences. In fact, any degree of precision desired can be obtained simply by making the subdivisions of delay line 50 small enough and the sensitivity of circuit 60 sufficiently fine.

When movable contact 67 reaches fixed contact 69, all of delay line 50 has been removed from the path of the input pulse train. On the next advance of contact 67, the full delay is re-inserted in the path of the input pulse train. Since the pulse required to activate stepping switch 68 through phase comparison circuit 60 and gate 54 is also travelling down delay line 50, this same pulse appears at the output of line 50, passes through gate 57 and appears a second time in the output. Thus, an extra time-slot containing an extra pulse is inserted in the message pulse train. This extra pulse is, of course, a duplicate of the preceding pulse in the train. A sufficient number of these extra pulses are, in this way, inserted in the pulse train to bring its repetition rate up to that of the clock pulse train.

In order to recover the original timing of the message pulse train and delete the extra pulses, it is necessary to note each advance of stepping switch 68. To this end, the output of gate 62 is applied to gate 66. Each time switch 68 is advanced, a pulse is simultaneously applied to gate 66 and lead 74 is energized, provided only that fixed contact 69 is not energized. Pulses therefore appear on lead 74 for each advance of switch 68 except the advance from contact 69 to contact 72. At this time, however, lead 75 is energized and gate 65 partially enabled. The next advance pulse from gate 62 therefore fully enables gate 65 and produces an output on lead 77. Lead 77 is therefore energized only when movable contact 67 advances from fixed contact 69 to fixed contact 72, that is, when the entire delay of line 50 is re-inserted in the path of the message pulse train.

The purpose of the signals on leads 74 and 77 will be described in detail in connection with FIG. 3. It is to be noted, however, that a pulse on lead 74 indicates a reduction in delay of one-fourth of the clock pulse period while a pulse on lead 77 indicates a reinsertion of the entire delay and hence the insertion of a spurious extra pulse.

It can be seen that the circuit of FIG. 2 operates to retime a message pulse train so as to keep the message pulse train in phase with a clock pulse train to within one-eighth of a pulse period. As discussed above, the accuracy of this phasing can be improved to any degree desired by simple adjustments of the circuit. In addition, it was assumed that the clock pulse repetition rate was higher than the message pulse repetition rate. Using a phase comparison circuit capable of distinguishing between plus and minus phase disparities, it would also be possible to retime to a clock pulse rate having any other relation to the instantaneous message pulse rate. Simple adjustments of the circuit would then be made to increase as well as decrease the delay. Stepping switch 68, for example, could be reversible.

In accordance with the invention, there appears at terminal 80 a replica of the message pulse train retimed to a higher repetition rate and including, at intervals, spurious pulses necessary to bring the repetition rate up to that of the clock pulses. The purpose of delay line 59 will be made apparent hereafter. The circuit of FIG. 2 performs all of the functions required for the time-base converter circuits 20 of FIG. 1 and may be used for this purpose.

In the multiplexing system of FIG. 1, it is also necessary to program the multiplexing operation and to encode the retiming signals for transmission to the remote time-base recovery circuits. The circuit of FIG. 3 will perform these functions.

Figure 3:
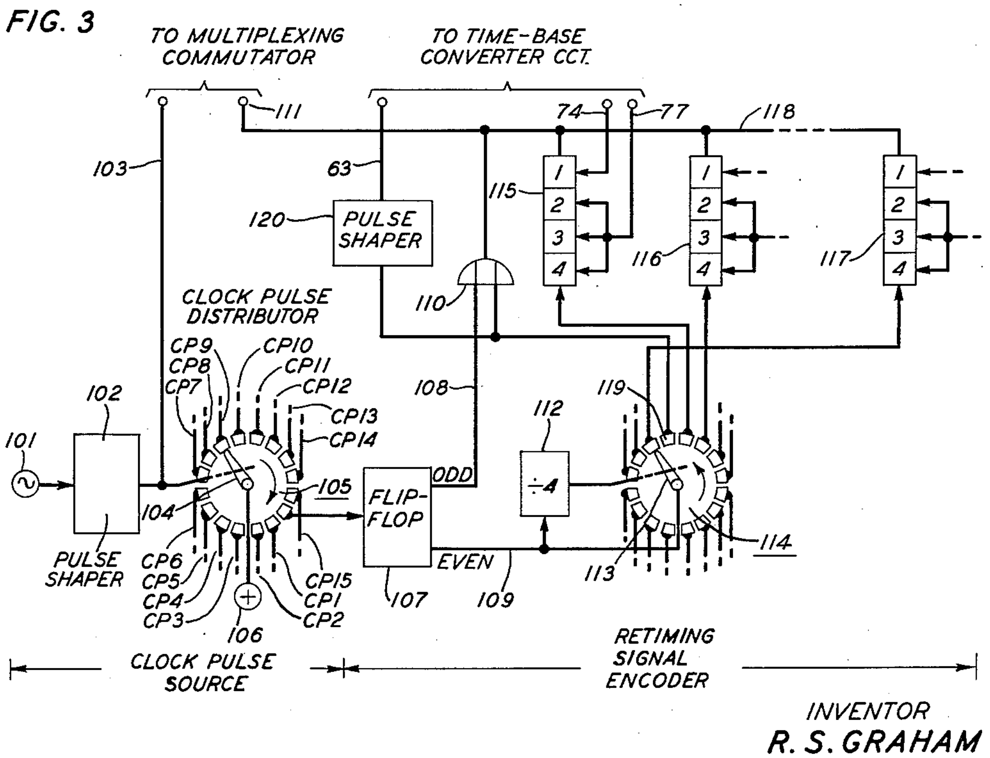
FIG. 3 is a more detailed diagram of the master clock and retiming signal encoder of FIG. 1.

Referring to the circuit of FIG. 3, there is shown a programming circuit and a retiming signal encoder suitable for use in the multiplexing system of FIG. 1. In order better to understand the operation of the circuit of FIG. 3, it will be assumed that it is desired to multiplex fifteen different pulse signals originating at fifteen different geographical locations. Each of these pulse trains, furthermore, has a nominal repetition rate of 10 million pulses per second. Each of these signals may comprise, for example, a pulse code modulated television signal or hundreds of pulse code modulated telephone voice signals. In any case, due to the substantial geographical separation of the pulse signal sources, the various pulse trains are not exactly synchronized either in phase or in repetition rate. Crystal oscillators, which maintain their frequency to less than a few parts per million at the ten megacycle repetition rate become expensive and complex. To allow for the variations of simple oscillators and for possible variations in propagation times of the transmission systems, the repetition rates of the various pulse trains have therefore been assumed to vary between 9.999 and 10.001 megacycles.

Returning to FIG. 3, an oscillator 101 is provided as a source of the master timing information. Oscillator 101 has an operating frequency of 160.032 megacycles and may be of any conventional design capable of this frequency. The output of oscillator 101 is applied to a pulse shaping circuit 102 which converts the sinusoidal input waveform into a clock pulse train having the same repetition rate, i.e., 160.032 pulses per second. The output of pulse shaper 102 is a continuous train of pulses and controls the timing of the entire multiplexing operation. Clock pulses on lead 103, for example, may be used to drive the multiplexing commutator 26 of FIG. 1.

Clock pulses from pulse shaper 102 are also used to drive the brush 104 of clock pulse distributing commutator 105. Commutator 105, illustrated as a mechanical commutator, will, at the frequencies assumed, comprise an electronic commutator of any type known in the art. Its purpose is to deliver a voltage from source 106 successively to each of its sixteen commutator segments. The voltage on each commutator segment will therefore comprise a series of pulses having a repetition rate of one-sixteenth of the basic clock pulse rate, that is 10.002 million pulses per second. It will be noted that this repetition rate is higher than the expected repetition rate of any of the signal pulse trains to be multiplexed. The 10.002 megacycle pulse trains derived in commutator 105 are therefore used to retime each of the signal pulse trains. That is, the pulse train on each of the segments of commutator 105 except one is applied to the phase comparison circuit of one of the time-base converter circuits illustrated in FIG. 1, such as input 79 to phase comparison circuit 60 in FIG. 2. The sixteenth commutator segment is connected to a flip-flop circuit 107.

Flip-flop circuit 107 may be a conventional bistable multivibrator circuit which changes state on each application of a pulse to its input. On each change of state, circuit 107 produces a pulse on one of its two output leads 108 and 109. The odd output pulses, occurring on lead 108, occur at approximately a five megacycle rate and may be used for framing the multiplex pulse train. To this end, they are applied through an "OR" circuit 110 to output terminal 111. The output on terminal 111, in turn, comprises the input to the $(n+1)$th or sixteenth, segment of commutator 26 of FIG. 1.

The even output pulses, occurring on lead 109, also occur at approximately a five megacycle rate and are simultaneously applied to a pulse rate dividing circuit 112 and to the brush 113 of a commutator 114. The output of dividing circuit 112, comprising a train of pulses occurring at a rate of approximately 1.25 million pulses per second, are utilized to drive the brush 113 of commutator 114 successively across the commutator segments. Brush 113 therefore delivers four successive pulses from lead 109 to each of the segments of commutator 114.

Commutator 114 has sixteen segments, fifteen of which are connected to corresponding ones of fifteen four-stage shift registers 115, 116 . . . 117. The four pulses delivered to each of registers 115 through 117 are used to shift the contents of each of these registers out on bus 118 in succession. Bus 118 is connected to terminal 111 and delivers to terminal 111, in succession, the contents of registers 115 through 117 at approximately a five megacycle rate. In addition, segment 119 of commutator 114 delivers four pulses from brush 113 to terminal 111 through OR circuit 110.

The contents of each of shift registers 115 through 117 is determined by the control signals on leads such as leads 74 and 77. A signal on lead 74, for example, is used to "set" the first stage of register 115. Similarly, a signal on lead 77 is used to set the second, third and fourth stages of register 115. Signals on lead 74, of course, are derived from the similarly numbered lead in the circuit of FIG. 2 and indicate a reduction in the delay of the time-based converter circuit by one-quarter of a pulse period. Signals on lead 77 are also derived from the circuit of FIG. 2 and indicate that the entire delay of the converter has been re-inserted and hence a spurious "dummy pulse" has been inserted in the message wave. Three successive pulses are used to represent this condition because this information is essential to a proper recovery of the original timing of the message wave. Any two of these three pulses may be used to delete the extra pulse and hence this redundancy provides a degree of protection against loss of a pulse through transmission difficulties.

It will be seen that the pulse train on lead 111 has a basic repeitition rate of approximately 10 million pulses per second. The odd pulse positions of this train regularly contain a pulse from lead 108. This regular pulse occurrence may be used at the remote demultiplexing station to "frame" the multiplex signal.

The even pulse positions of the pulse train at terminal 111 represent, successively, four pulse positions for each of the segments of commutator 114. The first four of these pulse positions contain the four pulses delivered by way of segment 119 and OR circuit 110. These pulses may be used to "frame" the retiming code sequence generated by the circuit of FIG. 3. Each successive four of these pulse positions contains the code representation of the retiming signals developed by the circuit of FIG. 2 and applied to leads 74 and 77. With this code representation, a pulse in the first pulse position of any of the four-position groups indicates a reduction in delay of one step in the corresponding message pulse train. Pulses in any two of the three remaining pulse positions indicates the insertion of an extra pulse and a recycling of the entire delay.

The four successive pulses delivered to segment 119 of commutator 114, in addition to passing through OR circuit 110, are also applied to pulse shaping circuit 120. Circuit 120 shapes these four successive pulses into a single pulse by means of pulse stretching or other techniques. This pulse is applied by way of lead 63 to enable each of the gates such as gate 62 in the time-base converter circuits, such as the circuit of FIG. 2. This pulse is an enabling pulse which permits changes in the position of the stepping switches 68 only when it is present. In this way, the contents of registers 115 through 117 are allowed to change only once for each revolution of brush 113 in commutator 114. Under the worst possible conditions, where the clock pulses generated by commutator 105 are at a rate of 10.002 million pulses per second and the repetition rate of the message wave pulses is 9.999 pulses per second, quarter period phase corrections for each wave will have to be made at the most only 12,000 times per second, i.e., $4(10.002-9.999)\times10^6$. Brush 113 of commutator 114, however, is rotating at a rate of approximately 78,000 times per second $(1.25\times10^6\div16)$ and hence will be more than adequate to handle the retiming signal coding even under the most adverse conditions.

Returning to FIG. 1 of the drawings, it can be seen that each time-base converter circuit 20 in the time converter station 17 may be implemented by a circuit such as that shown in FIG. 2. Clock pulses for each of these converter circuits 20 are derived from commutator 105 in FIG. 3. The output of each of these converter circuits, appearing at terminal 80 in FIG. 2, is applied to one of the segments of multiplexing commutator 26. The delay circuit 59 in FIG. 2 serves to delay the retimed pulse train for 64 pulse periods, i.e., the period required for brush 113 in FIG. 3 to make one complete revolution. In this way, the coded retiming signals are transmitted to the remote station before the pulse trains to which they apply are transmitted. This delay could just as easily be inserted at the remote end of the transmission system.

The coded output of the circuit of FIG. 3, appearing at terminal 111, is applied to the sixteenth segment of multiplexing commutator 26 in FIG. 1. Brush 27 picks up one pulse from each segment to form a time divided multiplex train in which fifteen channels contain the retimed pulse trains from the fifteen independent pulse transmitters and the sixteenth channel contains the framing pulses and the coded retiming signals for all of the fifteen message channels. At the remote end of transmission line 16, the coded information in this sixteenth channel is used to recover the original timing of each of the message pulse waves. Apparatus for this purpose will now be described.

Figures 4, 5:
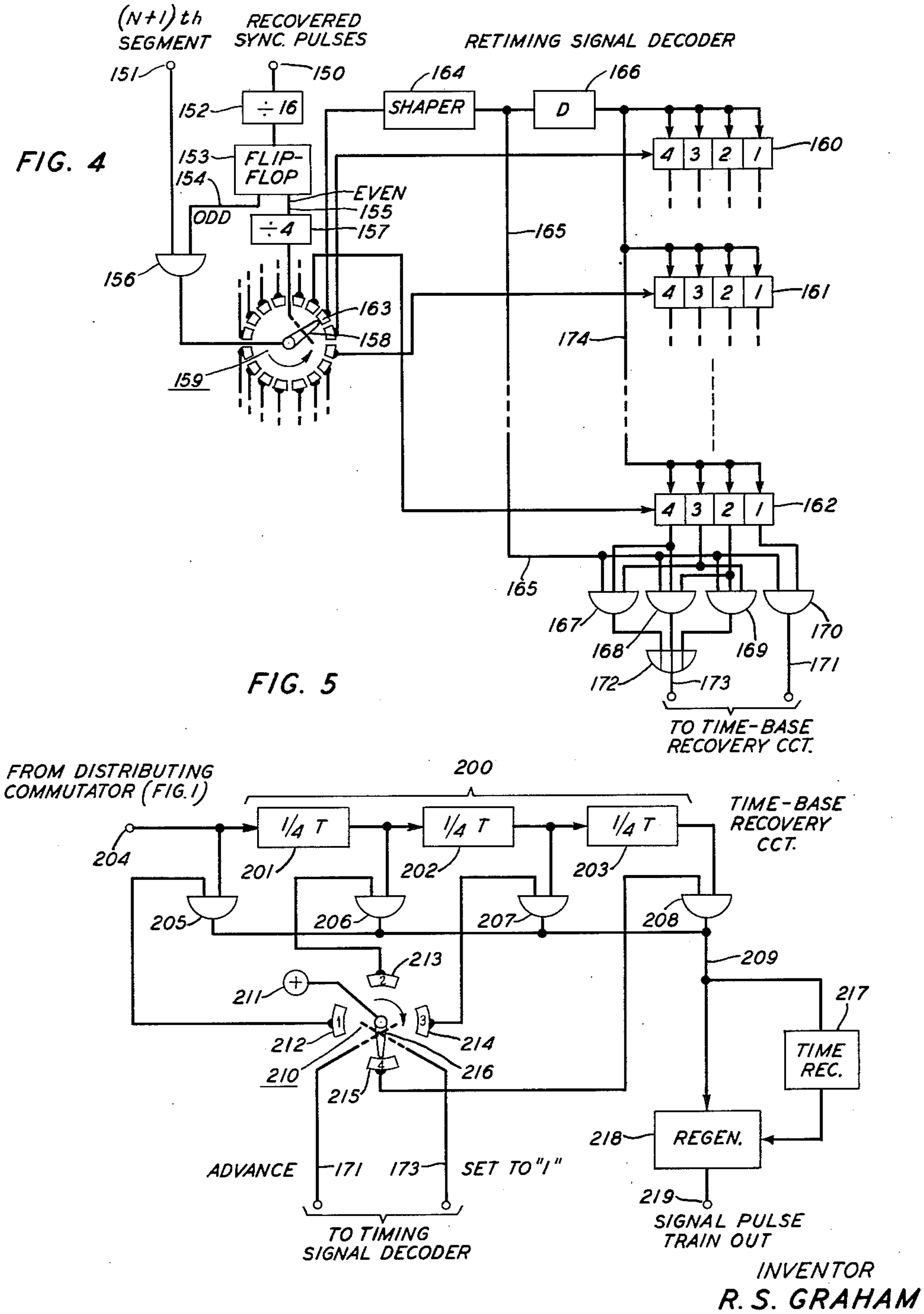
FIG. 4 is a detailed diagram of the retiming signal decoder of FIG. 1.
FIG. 5 is a detailed diagram of one of the time base recovery circuits of FIG. 1.

Referring to FIG. 4 of the drawings, there is shown a retiming signal decoding circuit suitable for use with the encoding circuit of FIG. 3 in the multiplexing system of FIG. 1. To terminal 150 of FIG. 4 there are applied clock pulses at the 160.032 megacycle rate, derived from the synchronization recovery circuit 30 of FIG. 1. To terminal 151 of FIG. 4 there is applied the output from the $(n+1)$th, or sixteenth, segment of distributing commutator 28 in FIG. 1. The pulses delivered to this segment by brush 29 represent the framing and coded timing signals generated in the circuit of FIG. 3 and delivered to the $(n+1)$th segment of collecting commutator 26 in FIG. 1.

The 160.032 megacycle pulses delivered to terminal 150 are applied to pulse rate divider 152 where they are divided by a factor of sixteen to produce output pulses at a rate of 10,002 million pulses per second. These pulses are applied to a flip-flop circuit 153 which changes state of each application of a pulse to its input. On each change of state, circuit 153 produces a pulse on one of its two output leads 154 and 155. The odd output pulses, occurring on lead 154, are applied to AND gate 156 at approximately a five megacycle rate. Gate 156 is therefore enabled for the duration of each framing pulse.

The even output pulses, occurring on lead 155, also occur at approximately a five megacycle rate and are applied to a pulse rate dividing circuit 157. The output of dividing circuit 157, comprising a train of pulses occurring at a rate of approximately 1.25 million pulses per second, are utilized to drive brush 158 of commutator 159 successively across the commutator segments. Gate 156 is enabled during the even pulse intervals of the pulse train applied to terminal 151 and therefore delivers the coded timing signals to brush 158 at approximately a five megacycle rate. Brush 158, advancing between successive segments at a 1.25 megacycle rate, rests on each commutator segment for four successive pulse intervals. These four pulse intervals carry the coded retiming signals.

The four-bit coded retiming signal delivered to each segment but one of commutator 159 is shifted into one of fifteen four-stage shift registers 160 through 162. Following each revolution of brush 158, therefore, the fifteen retiming codes, corresponding to the fifteen multiplexed pulse trains, are stored in these shift registers.

On reaching the sixteenth segment of commutator 159, segment 163 in FIG. 4, brush 158 delivers the four framing pulses to pulse shaping circuit 164. Circuit 164 shapes these four successive pulses into a single pulse by means of pulse stretching or other techniques. This single pulse is applied simultaneously to read-out bus 165 and delay circuit 166.

Each of shift registers 160 through 162 has a bank of gates connected to the outputs of the individual stages. These gates perform the logic necessary for decoding the retiming signals. Since the circuitry is identical for each of shift registers 160 through 162, only one has been illustrated. Connected to the outputs of the individual stages of shift register 162 are AND gates 167, 168, 169 and 170. One input to each of these AND gates 167 through 170 is supplied from read-out bus 165. The two other inputs to AND gate 167 are supplied from the third and fourth stages of register 162. The two other inputs to AND gate 168 are supplied from the second and fourth stages of register 162; the two other inputs to AND gate 169 are supplied from the second and third stages of register 162; and the single other input to AND gate 170 is supplied from the first stage of register 162.

According to the code imposed by the circuits of FIGS. 2 and 3, a pulse in the first stage of register 162 indicates that the delay in the path of the pulse train associated with register 162 should be increased by one-quarter of a pulse period. The pulse on read-out bus 165 from segment 163 therefore reads out this pulse, if it is present, and applies it to lead 171. If pulses are present in any two of the second, third and fourth stages of register 162, the entire delay has been inserted in the path of the pulse train and a dummy pulse added. At least one of AND gates 167, 168, and 169 will detect this fact when pulsed from bus 165. The outputs of AND gates 167, 168 and 169 are introduced into OR gate 172 and will, in turn, produce an output on lead 173.

The pulse applied to delay circuit 166 is delayed therein just sufficiently to allow the pulse on read-out bus 165 to completely read out the codes stored in all of the shift registers 160 through 162. After this delay, this pulse is applied to reset bus 174. A pulse on bus 174 serves to reset all of the shift registers 160 through 162. In this way, the shift registers are prepared for the arrival of new code digits from commutator 159.

It can be seen that the circuit of FIG. 4 operates to segregate and decode the various coded retiming signals appearing in the sixteenth time-slot on the multiplex transmission channel. Each of shift registers 160 through 161 is, of course, equipped with the same type of logic as shift register 162. The two retiming signals on leads 171 and 173 are used to recover the original timing of the corresponding message pulse train and to delete the extra pulses. A time-base recovery circuit suitable for this purpose is illustrated in FIG. 5.

In FIG. 5 of the drawings there is shown a time-base recovery circuit suitable for the multiplexing system of FIG. 1 and comprising a delay line 200 divided into three sections 201, 202 and 203. A pulse train from any one of the first fifteen segments of distributing commutator 28 in FIG. 1 is applied to delay line 200 through input terminal 204. Connected to the input of delay line 200 is an AND gate 205 while AND gates 206 and 207 are connected to the intermediate points on delay line 200 and AND gate 208 is connected to the output. The outputs of all of the AND gates 205 through 208 are applied to a common lead 209.

A stepping switch 210 is provided for successively applying a voltage from source 211 to four fixed contacts 212, 213, 214 and 215. Switch 210, illustrated as a mechanical switch may, of course, comprise an electronic stepping switch. The fixed contacts 212 through 215 are connected to second inputs of AND gates 205 through 208, respectively. Thus movable contact 216 of switch 210 successively applies the voltage from source 211 to gates 205 through 208.

Movable contact 216 of switch 210 is responsive to signals applied over either one of two leads 171 and 173, respectively. A signal on lead 171 advances contact 216 one step in the clockwise direction. A signal on lead 173 sets movable contact 216 to contact 212 no matter what its position. Electronic stepping switches such as ring counters can easily be constructed in this manner in accordance with well-known principles. The signals on leads 171 and 173 are, of course, derived from the decoding circuit of FIG. 4. The signal on lead 171 indicates that the delay in the path of the message pulse train should be increased by one-quarter of a pulse period. Contact 216, advancing one step in the clockwise direction, produces this result.

The signal on lead 173 indicates that the delay should be reduced to zero and that an extra pulse be deleted. Contact 216 is therefore set to fixed contact 212. The pulse about to emerge from section 203 of delay line 200 is thereby lost, AND gate 208 no longer being energized, and the next pulse is allowed to pass through AND gate 205. The original timing of the message wave is therefore substantially restored at lead 209. Some phase "jittering" still exists, however, due to the use of only three segments in the delay line 50. A timing recovery circuit 217 and a pulse regenerator 218 are utilized to remove these slight phase discrepancies. The message pulse train, with its original timing smoothed out, appears at terminal 219. This pulse train may now be transmitted to the corresponding one of the remote pulse receivers such as pulse receivers 13 through 15 in FIG. 1.

It can be seen that a pulse multiplexing system such as that disclosed in block form in FIG. 1 and implemented in FIGS. 2 through 5 may be used to multiplex and transmit a plurality of asynchronous pulse trains. In accordance with the invention, each of the asynchronous pulse trains is retimed to a common clock rate, multiplexed and transmitted at a multiple of this common clock rate, demultiplexed, and the original timing of each of the pulse trains recovered before transmitting them on to their destinations. The retiming information necessary to recover this original timing is transmitted along with the message trains as pulse coded signals.

While the retiming arrangements of the present invention have been described with reference to a multiplex transmission system, it is to be understood that these arrangements are only illustrative of numerous and varied other arrangements which could represent applications of the principles of the invention. Such other arrangements may readily be devised by those skilled in the art without departing from the spirit or scope of the invention.

What is claimed is:

1. A time division transmission system for a plurality of asynchronous pulse trains comprising, means for converting the time base of each of said pulse trains to a common time base, means responsive to said time base converting means for deriving coded pulse signals indicative of the change in time base for each of said pulse trains, means for multiplexing said converted pulse trains and said coded pulse signals on a common time-divided transmission facility, means for demultiplexing the signals on said transmission facility, and means responsive to the demultiplexed coded pulse signals for recovering the original time base of each of said demultiplexed pulse trains.

2. The time division transmission system according to claim 1 including a source of clock pulses having a repetition rate higher than the repetition rate of any of said pulse trains, said common time base being supplied by said clock pulses.

3. A time division transmission system according to claim 2 wherein each of said time base converting means comprises variable delay means, means for applying one of said pulse trains to said delay means, means for varying the delay of said delay means just sufficiently to keep said applied pulse train and said clock pulses in phase, and means for increasing the delay of said delay means by one pulse period of said clock pulses when said applied pulse train and said clock pulses are a full period out of phase.

4. In combination, a plurality of asynchronous message pulse trains, an equal plurality of time base converting means, means for applying each of said message pulse trains to a different one of said time base converting means, each of said time base converting means comprising means for comparing the applied one of said message pulse trains with a clock pulse train having a repetition rate higher than any of said message pulse trains, means for varying the transmission path lengths of said applied message pulse trains just sufficiently to maintain synchronism between said applied message pulse trains and said clock pulse train, and means for inserting a spurious pulse into said applied message pulse trains when and only when the variation in said transmission path equals a full pulse period of said clock pulse train.

5. The combination according to claim 4 further including means for deriving control signals representative of each of said transmission path lengths, and means responsive to said control signals for recovering the original timing of said message pulse trains.

6. The combination according to claim 4 further including means for deriving a deleting signal each time a spurious pulse is inserted into one of said message pulse trains, and means responsive to said deleting signals for deleting said spurious pulses.

7. A time division transmission system for a plurality of pulse trains having different average pulse rates, said system comprising, a first plurality of tapped delay lines, means for applying each of said pulse trains to a different one of said first plurality, a multiplex transmission facility, means for selectively connecting any one of the taps on each of said first plurality of delay lines to said transmission facility, means for automatically varying the connections to said taps on each of said first plurality of delay lines so as to maintain the outputs of said delay lines in a synchronous timed relationship, and means for adding a pulse to each of said pulse trains when that pulse train is a full pulse period out of synchronism with the output of the associated delay line.

8. The time division transmission system according to claim 7 further including means for encoding the position of each of said connections in a pulse code, and means for applying said pulse codes to said transmission facility.

9. The time division transmission system according to claim 8 further including a second plurality of tapped delay lines, means for distributing the pulses on said transmission facility to said second plurality of tapped delay lines, and means responsive to said pulse codes for selectively connecting the taps on each of said second plurality of delay lines to a different one of a plurality of output terminals.

10. In combination, a source of a first train of pulses having a given repetition rate, a source of a second train of pulses having a different repetition rate, and means for synchronizing said first and second pulse trains, said synchronizing means comprising variable delay means, means for applying said first pulse train to said delay means, phase comparison means, means for applying the output of said delay means to said phase comparison means, means for applying said second pulse train to said phase comparison means, means responsive to said phase comparison means for varying said delay means just sufficiently to maintain said second and said first pulse trains in phase, and means for recycling said delay means when said first and second input pulse trains become a full pulse period out of phase.

11. The combination according to claim 10 in which said second pulse train has a substantially higher pulse repetition rate than said first pulse train, and means including said recycling means for inserting a spurious pulse into said first pulse train each time said first and second pulse trains fall a full pulse period out of synchronism.

12. The combination according to claim 11 wherein said recycling means comprises means for reducing the delay of said delay means to zero each time said first and second pulse trains fall a full pulse period out of synchronism.

13. In combination, a first train of pulses having a given repetition rate, a second train of pulses having a repetition rate higher than said given rate, and means for synchronizing said first and second pulse trains, said synchronizing means comprising variable delay means, means for applying said first pulse train to said delay means, phase comparison means for comparing the output of said delay means with said second pulse train, means responsive to said phase comparison means for varying said delay means just sufficiently to maintain the output of said delay means in phase with said second pulse train, and means for recycling said delay means when said first and second pulse trains are a full pulse period out of phase.

14. A time base converter circuit comprising a source of message pulses having a given repetition rate, a source of clock pulses having a repetition rate higher than said message pulses, delay line means divided into three sections each having a delay of one-quarter of a pulse period of said clock pulses, output means, means for selectively inserting said delay line sections in a transmission path between said message pulse source and said output means, means for comparing the pulses at said output means with said clock pulses to determine phase differences, means for removing one of said delay line sections from said transmission path when said phase difference is equal to one-quarter of a clock pulse period, and means for reinserting all of said delay line sections when all of said sections have been removed and said phase difference becomes equal to one-quarter of a clock pulse period.

15. In a time division transmission system, a plurality of pulse trains of substantially the same repetition rate but subject to relative variations therein, a transmission medium and multiplexing means for combining said pulse trains in time division for transmission over said medium, said multiplexing means comprising a plurality of variable delay lines, one for each of said pulse trains, means for applying each of said pulse trains to its associated delay line, commutator means for successively applying the outputs of said delay lines to said transmission medium, a source of reference waves, phase comparison means for determining the phase difference between each of said pulse trains and said reference waves and means for varying the delay provided by each of said delay lines in response to the phase difference between the pulse train applied to said each delay line and said reference waves in a sense to bring said pulse trains and said reference waves into phase agreement.

16. The combination in accordance with claim 15 wherein said source comprises a source of clock pulses having a repetition rate slightly higher than the highest repetition rate of any of said pulse trains.

17. The combination in accordance with claim 15 and means responsive to a phase difference between any one of said pulse trains and said reference waves of substantially one pulse period for inserting an extra pulse into said any one of said pulse trains.

References Cited in the file of this patent

UNITED STATES PATENTS

| | | |
|---|---|---|
| 2,454,792 | Grieg | Nov. 30, 1948 |
| 2,692,916 | Stenning | Oct. 26, 1954 |
| 2,796,464 | Clayden | June 18, 1957 |
| 2,860,323 | Burkhart et al. | Nov. 11, 1958 |